UNITED STATES PATENT OFFICE.

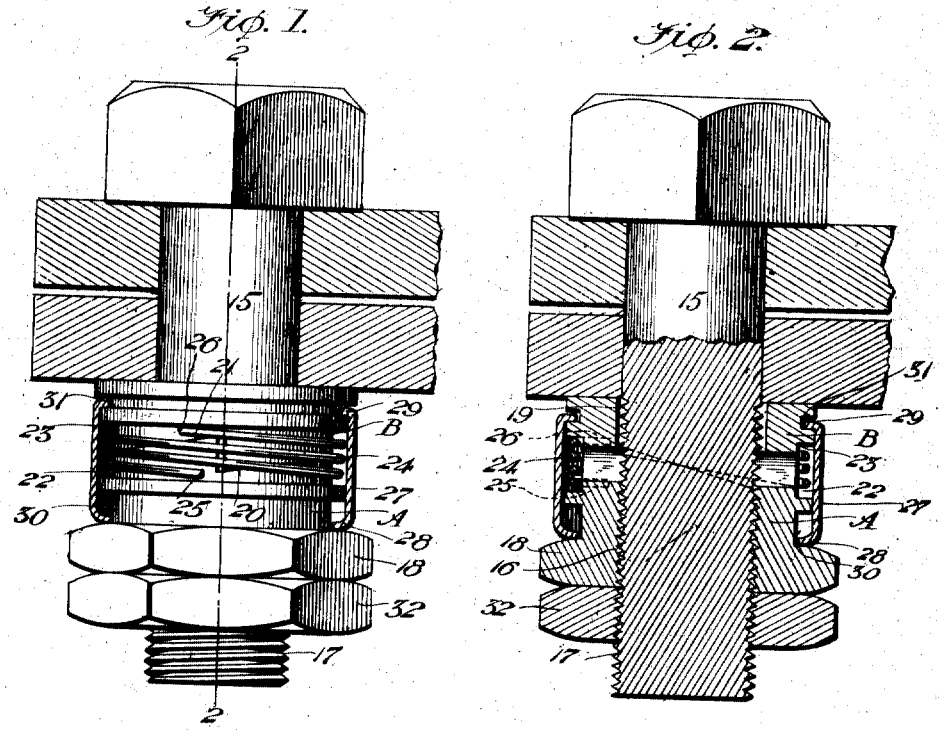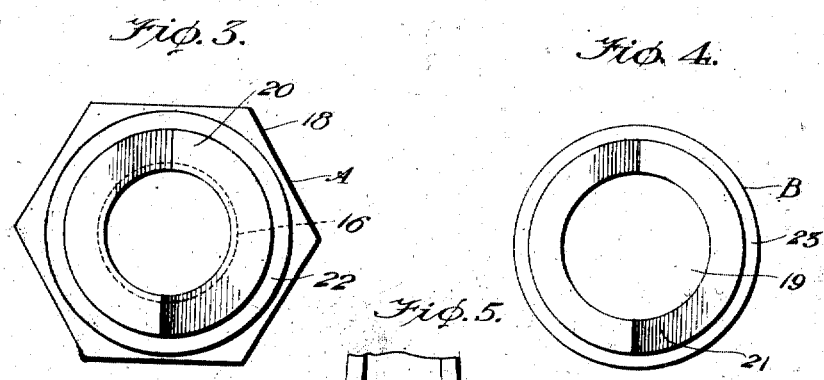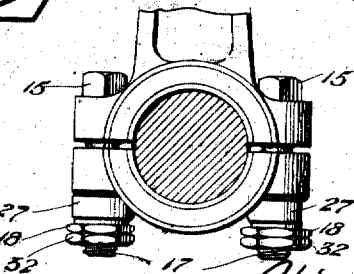

PAUL F. WESTON AND FRANK G. MUELLER, OF SCRANTON, PENNSYLVANIA.

SELF-ADJUSTING BEARING-NUT.

1,278,538.

Specification of Letters Patent. Patented Sept. 10, 1918.

Application filed October 6, 1917. Serial No. 195,151.

*To all whom it may concern:*

Be it known that we, PAUL F. WESTON and FRANK G. MUELLER, citizens of the United States, residing at Scranton, in the county of Lackawanna and State of Pennsylvania, have invented new and useful Improvements in Self-Adjusting Bearing-Nuts, of which the following is a specification.

This invention relates to nuts and it has particular reference to a nut which will automatically adjust itself to compensate for wear on the parts, or shrinkage of the parts assembled by the nut and the bolt on which it is mounted.

The invention has for its object to produce a self-adjusting or self-tightening nut of simple and improved construction which may be advantageously used in connection with bearings of various kinds for the purpose of taking up and compensating for wear.

A further object of the invention is to produce a self-adjusting and self-tightening nut comprising two parts or members having opposed spirally disposed cam faces and assembling means for said parts or members including a housing and a spring whereby one member of the nut will be turned or rotated about the common axis of the two parts or members.

With these and other ends in view which will readily appear as the nature of the invention is better understood, the same consists in the improved construction, arrangement and combination of parts which will be hereinafter more fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Figure 1 is a side elevation partly in section showing the improved nut and bolt on which the same is mounted, and showing also a part of a bearing to which it is applied.

Fig. 2 is a sectional view taken on the line 2—2 of Fig. 1.

Figs. 3 and 4 are plan views showing the opposed faces of the parts or members of the nut.

Fig. 5 is a detail side view on a reduced scale showing a bearing to which the nut is applied.

Corresponding parts in the several figures are denoted by like characters of reference.

The improved nut which has been shown in Figs. 1 and 2 as being mounted on a bolt 15, is composed of two principal parts or sections A and B. The part A is internally threaded as at 16 for engagement with the thread 17 of the bolt 15. Said part or member A is also provided with a head 18 constituting a wrench seat. The part or member B has a bore 19 of a diameter slightly exceeding that of the threaded portion of the bolt. The opposed faces of the parts or members A and B are provided with spirally disposed cam faces 20 and 21.

The external circumferential faces of the parts or members A and B are provided with corresponding grooves 22, 23 for the accommodation of a coiled spring 24, the ends of which are embedded in or otherwise connected with the respective members A and B as indicated at 25, 26, the force of the spring being expended to cause the rotation of the member B with respect to the member A, thereby causing the said members A and B to be forced or spread apart by the contacting action of the opposed cam faces. The spring 24 is inclosed by a cylindrical housing 27 having terminal flanges 28, 29 engaging annular grooves 30, 31 in the respective members A and B, one or both of said grooves being of sufficient width to permit the lengthwise movement of the members A and B to each other under the influence of the contacting cam faces 20 and 21.

An ordinary jam nut 32 has been shown for the purpose of locking the nut member A in adjusted position on the bolt 15, but the use of such jam nut is well known in the art and the same is not herein claimed.

In operation, when the nut member A is tightened on the bolt it will tend to drive the member B in advance of itself, the opposed cam faces of the members A and B producing a ratchet whereby the member B will be tightened in advance of the member A, the spring 24 being at the same time tensioned. When the parts have been properly tightened the jam nut 32 may be placed in position and tightened. Should wear or shrinkage occur, the nut member B will be advanced by the force of the spring 24 and will thus be maintained in a seated position, causing the parts assembled by the bolt and the nut to be held very securely. If the wear or shrinkage should exceed the power of compensation of the spring 24, the nut member A may be retightened and the jam nut 32 readjusted. A particular advantage of the invention is that the nut will not cramp or create excessive pressure or friction to a shaft or running part, nor will any pressure tend to push the nut back as it is interlocking at every point.

We claim:—

1. A self-adjusting nut comprising two members having opposed spirally disposed cam-shaped meeting faces producing interengaging ratchets, and a coiled spring terminally connected with the two members to rotate one with respect to the other when under tension.

2. A self-adjusting nut comprising two members having opposed spirally disposed cam-shaped meeting faces producing interengaging ratchets, and a coiled spring terminally connected with the two members to rotate one with respect to the other when under tension, one of said members being internally threaded and the other member having an unthreaded bore of larger diameter than the threaded portion of the first mentioned member.

3. A self-adjusting nut comprising two members having opposed spirally disposed cam-shaped meeting faces producing interengaging ratchets, and a coiled spring terminally connected with the two members to rotate one with respect to the other when under tension, one of said members being internally threaded and the other member having an unthreaded bore of larger diameter than the threaded portion of the first-mentioned member, said internal threaded member having an external wrench seat.

4. A self-adjusting nut comprising two members having opposed spirally disposed cam-shaped meeting faces producing interengaging ratchets, one of said members being internally threaded and the other member having an unthreaded bore of larger diameter than the threaded portion of the first-mentioned member, said internal threaded member having an external wrench seat, in combination with a spring terminally connected with the two members and tending to rotate one of said members with respect to the other member.

5. A self-tightening nut comprising two members having opposed ratchet faces and one of said members being internally threaded and the other member being provided with a bore of a diameter exceeding that of the threaded portion of the first-mentioned member, in combination with an externally disposed spring terminally connected with the two members and a housing surrounding said spring, said housing having terminal flanges for the reception of which the two members are provided with annular grooves.

6. A self-tightening nut comprising two members having opposed ratchet faces and one of said members being internally threaded and the other member being provided with a bore of a diameter exceeding that of the threaded portion of the first-mentioned member, in combination with an externally disposed spring terminally connected with the two members and a housing surrounding said spring, said housing having terminal flanges for the reception of which the two members are provided with annular grooves, said grooves being dimensioned to permit longitudinal movement of the housing with respect to one of the members.

In testimony whereof we affix our signatures.

PAUL F. WESTON.
FRANK G. MUELLER.